(12) United States Patent
Dimitriadis et al.

(10) Patent No.: US 9,570,092 B2
(45) Date of Patent: *Feb. 14, 2017

(54) REAL-TIME EMOTION TRACKING SYSTEM

(71) Applicant: AT&T INTELLECTUAL PROPERTY I, LP, Atlanta, GA (US)

(72) Inventors: Dimitrios Dimitriadis, Rutherford, NJ (US); Mazin E. Gilbert, Warren, NJ (US); Taniya Mishra, New York, NY (US); Horst J. Schroeter, New Providence, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/138,262

(22) Filed: Apr. 26, 2016

(65) Prior Publication Data

US 2016/0240214 A1    Aug. 18, 2016

Related U.S. Application Data

(63) Continuation of application No. 14/703,107, filed on May 4, 2015, now Pat. No. 9,355,650, which is a continuation of application No. 13/712,288, filed on Dec. 12, 2012, now Pat. No. 9,047,871.

(51) Int. Cl.
| | |
|---|---|
| *G10L 21/00* | (2013.01) |
| *G10L 25/00* | (2013.01) |
| *G10L 15/00* | (2013.01) |
| *G10L 25/63* | (2013.01) |
| *G10L 17/26* | (2013.01) |
| *G10L 25/48* | (2013.01) |
| *G10L 17/04* | (2013.01) |

(52) U.S. Cl.
CPC ............... *G10L 25/63* (2013.01); *G10L 17/04* (2013.01); *G10L 17/26* (2013.01); *G10L 25/48* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 4,142,067 A | 2/1979 | Williamson | |
| 4,592,086 A | 5/1986 | Watari et al. | |
| 6,480,826 B2 | 11/2002 | Pertrushin et al. | |
| 6,598,020 B1 | 7/2003 | Kleindienst et al. | |
| 6,622,140 B1 | 9/2003 | Kantrowitz et al. | |
| 7,165,033 B1 | 1/2007 | Liberman et al. | |

(Continued)

OTHER PUBLICATIONS

Narayanan, "U.S. Appl. No. 60/740,902", Nov. 30, 2005.

*Primary Examiner* — Jesse Pullias
(74) *Attorney, Agent, or Firm* — Greenblum & Bernstein, P.L.C.

(57) ABSTRACT

Devices, systems, methods, media, and programs for detecting an emotional state change in an audio signal are provided. A number of segments of the audio signal are analyzed based on separate lexical and acoustic evaluations, and, for each segment, an emotional state and a confidence score of the emotional state are determined. A current emotional state of the audio signal is tracked for each of the number of segments. For a particular segment, it is determined whether the current emotional state of the audio signal changes to another emotional state based on the emotional state and a comparison of the confidence score of the particular segment to a predetermined threshold.

20 Claims, 7 Drawing Sheets

(56) References Cited

U.S. PATENT DOCUMENTS

| | | |
|---|---|---|
| 7,222,075 B2 | 5/2007 | Petrushin et al. |
| 7,684,984 B2 | 3/2010 | Kemp et al. |
| 8,078,470 B2 | 12/2011 | Levanon et al. |
| 8,140,368 B2 | 3/2012 | Eggenberger et al. |
| 8,209,182 B2 | 6/2012 | Narayanan et al. |
| 8,812,171 B2 | 8/2014 | Filev et al. |
| 9,047,871 B2 | 6/2015 | Gilbert et al. |
| 2002/0194002 A1 | 12/2002 | Petrushin et al. |
| 2005/0114142 A1 | 5/2005 | Asukai et al. |
| 2011/0145001 A1 | 6/2011 | Kim et al. |
| 2011/0145002 A1 | 6/2011 | Melamed et al. |
| 2011/0295607 A1 | 12/2011 | Krishnan et al. |
| 2012/0323575 A1 | 12/2012 | Gibbon et al. |
| 2012/0323579 A1 | 12/2012 | Gibbon et al. |
| 2013/0132088 A1 | 5/2013 | Kim et al. |

| Segment | Emotional State | Confidence Score | Current Emotional State |
|---|---|---|---|
| ... | ... | ... | "satisfied" |
| this | "neutral" | 40 | "satisfied" |
| is | "neutral" | 65 | "satisfied" |
| unacceptable | "angry" | 90 | "angry" |
| I | | | |
| will | | | |
| ... | | | |

# REAL-TIME EMOTION TRACKING SYSTEM

CROSS-REFERENCE TO RELATED APPLICATIONS

The present application is a continuation of and claims priority to U.S. patent application Ser. No. 14/703,107, filed May 4, 2015, which is a continuation of U.S. patent application Ser. No. 13/712,288, filed on Dec. 12, 2012, now U.S. Pat. No. 9,047,871, each of the disclosures of which are incorporated herein by reference in their entirety.

FIELD OF THE DISCLOSURE

The present disclosure generally relates to the field of emotion recognition. More specifically, the present disclosure relates to the field of emotion tracking in an audio signal.

BACKGROUND OF THE DISCLOSURE

Most modern businesses rely heavily on a variety of communication systems, such as interactive voice response (IVR) systems, to administer phone-based transactions with customers, to provide customer support, and also to find potential customers. Many of the businesses record the phone-based transactions for training and quality control purposes, and some of the communication systems offer advanced speech signal processing functionalities, such as emotion recognition, for analyzing the recorded phone-based transactions.

The communication systems typically require a certain amount or length of voice or audio content, e.g., a whole phone call, to analyze and classify emotional states in the phone-based transactions. The emotional states may be analyzed and classified for the customers or company representatives. In this regard, the communication systems provide for quick and efficient review of the phone-based transactions to identify those phone-based transactions which may be desirable for training and quality control purposes.

DETAILED DESCRIPTION OF THE DRAWINGS

Figure 1:
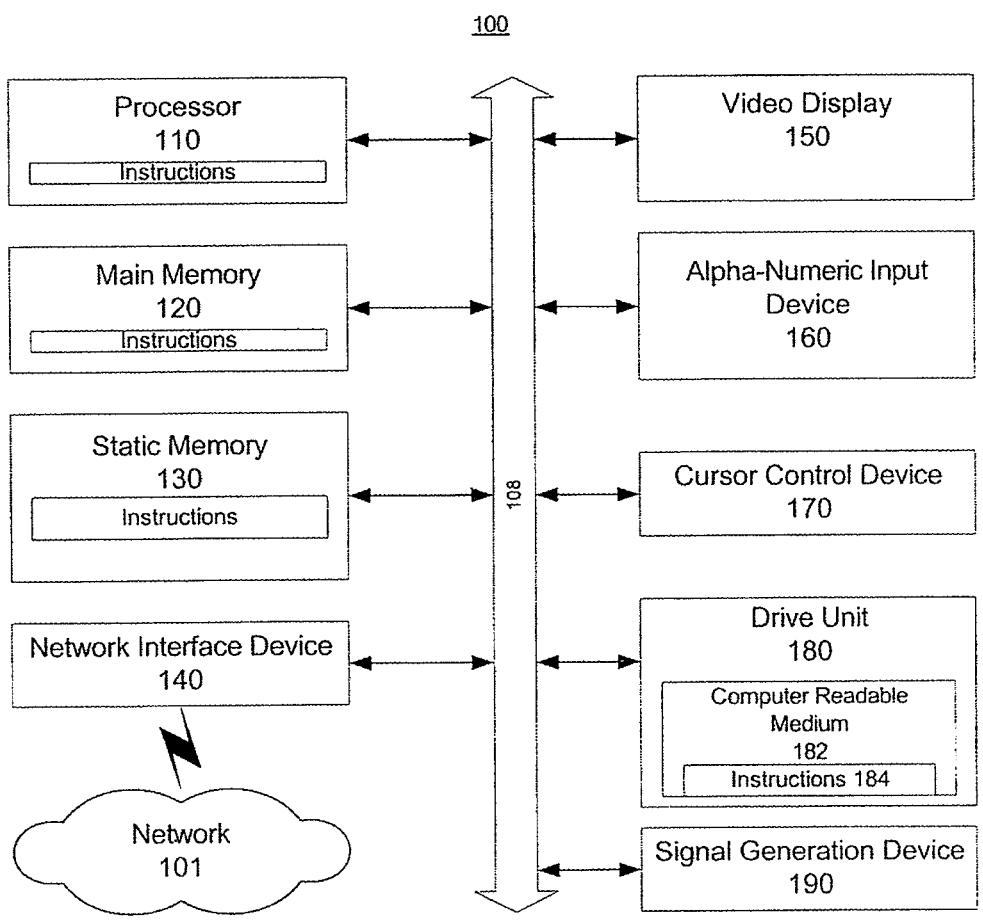
FIG. 1 shows an exemplary general computer system that includes a set of instructions for real-time tracking of emotions and detecting an emotional state change in an audio signal.

In view of the foregoing, the present disclosure, through one or more of its various aspects, embodiments and/or specific features or sub-components, is thus intended to bring out one or more of the advantages as specifically noted below.

According to an embodiment of the present disclosure, a device for detecting an emotional state change in an audio signal is provided. The device includes a processor and a memory. The memory stores instructions that, when executed by the processor, cause the processor to receive a plurality of segments of the audio signal. The instructions further cause the processor to sequentially analyze each segment of the plurality of segments and determine, for each segment, an emotional state from among a plurality of emotional states and a confidence score of the emotional state. The emotional state and the confidence score of each segment are sequentially analyzed, and a current emotional state of the audio signal is tracked throughout each of the plurality of segments. For each segment, it is determined whether the current emotional state of the audio signal changes to another emotional state of the plurality of emotional states based on the emotional state and the confidence score of the segment.

According to one aspect of the present disclosure, the instructions further cause the processor to provide a user-detectable notification in response to determining that the current emotional state of the audio signal changes to the other emotional state of the plurality of emotional states.

According to another aspect of the present disclosure, the instructions further cause the processor to provide a user-actionable conduct with the user-detectable notification in response to determining that the current emotional state of the audio signal changes to the other emotional state of the plurality of emotional states. In this regard, the user-actionable conduct is determined based on the current emotional state from which the audio signal changes and the other emotional state to which the current emotional state changes.

According to yet another aspect of the present disclosure, the instructions further cause the processor to provide a user-detectable notification only in response to determining that the current emotional state of the audio signal changes from a first predetermined state of the plurality of emotional states to a second predetermined state of the plurality of emotional states.

According to still another aspect of the present disclosure, each segment is analyzed in accordance with a plurality of analyses. For each segment, each of a plurality of emotional states and each of a plurality of confidence scores of the plurality of emotional states are determined in accordance with one of the plurality of analyses. According to such an aspect, the plurality of emotional states and the plurality of confidence scores of the plurality of emotional states are combined for determining the emotional state and the confidence score of the emotional state of each segment.

According to an additional aspect of the present disclosure, the plurality of analyses comprises a lexical analysis and an acoustic analysis.

According to another aspect of the present disclosure, each of the plurality of segments of the audio signal comprise a word of speech in the audio signal.

According to yet another aspect of the present disclosure, the processor determines that the current emotional state of the audio signal changes to the other emotional state of the plurality of emotional states when the confidence score of the segment is greater than a predetermined threshold, and the other emotional state is the emotional state of the segment.

According to still another aspect of the present disclosure, the processor determines that the current emotional state of the audio signal changes to the other emotional state of the plurality of emotional states when one of the emotional state of the segment is different than the current emotional state and the confidence score of the emotional state of the segment is less than a predetermined threshold for each of a predetermined number of consecutive ones of the plurality of segments.

According to an additional aspect of the present disclosure, the instructions further cause the processor to issue an instruction for controlling a motorized vehicle in response to determining that the current emotional state of the audio signal changes to the other emotional state of the plurality of emotional states.

According to another aspect of the present disclosure, the instructions further cause the processor to issue an instruction for controlling an alarm system in response to determining that the current emotional state of the audio signal changes to the other emotional state of the plurality of emotional states.

According to another embodiment of the present disclosure, a method for detecting an emotional state change in an audio signal is provided. The method includes receiving a plurality of segments of the audio signal, wherein the plurality of segments are sequential. The method further includes sequentially analyzing, by a processor, each segment of the plurality of segments and determining, for each segment and by the processor, an emotional state from among a plurality of emotional states and a confidence score of the emotional state. The processor sequentially analyzes the emotional state and the confidence score of each segment, and tracks a current emotional state of the audio signal throughout each of the plurality of segments. For each segment, the processor determines whether the current emotional state of the audio signal changes to another emotional state of the plurality of emotional states based on the emotional state and the confidence score of the segment.

According to one aspect of the present disclosure, the method further includes displaying a user-detectable notification on a display in response to determining that the current emotional state of the audio signal changes to the other emotional state of the plurality of emotional states.

According to another aspect of the present disclosure, the method further includes displaying a user-actionable conduct on the display with the user-detectable notification in response to determining that the current emotional state of the audio signal changes to the other emotional state of the plurality of emotional states. In this regard, the user-actionable conduct is determined based on the current emotional state from which the audio signal changes and the other emotional state to which the current emotional state changes.

According to yet another aspect of the present disclosure, the method further includes displaying a user-detectable notification on a display only in response to determining that the current emotional state of the audio signal changes from a first predetermined state of the plurality of emotional states to a second predetermined state of the plurality of emotional states.

According to still another aspect of the present disclosure, each segment is analyzed in accordance with a plurality of analyses. In this regard, for each segment, each of a plurality of emotional states and each of a plurality of confidence scores of the plurality of emotional states are determined in accordance with one of the plurality of analyses. The plurality of emotional states and the plurality of confidence scores of the plurality of emotional states are combined for determining the emotional state and the confidence score of the emotional state of each segment.

According to an additional aspect of the present disclosure, the plurality of analyses comprises a lexical analysis and an acoustic analysis.

According to another embodiment of the present disclosure, a tangible computer-readable medium having an executable computer program for detecting an emotional state change in an audio signal is provided. The executable computer program, when executed by a processor, causes the processor to perform operations including receiving a plurality of segments of the audio signal, with the plurality of segments being sequential. The operations further include sequentially analyzing each segment of the plurality of segments and determining, for each segment, an emotional state from among a plurality of emotional states and a confidence score of the emotional state. The operations also include sequentially analyzing the emotional state and the confidence score of each segment and tracking a current emotional state of the audio signal throughout each of the plurality of segments. In addition, the operations include determining, for each segment, whether the current emotional state of the audio signal changes to another emotional state of the plurality of emotional states based on the emotional state and the confidence score of the segment.

According to one aspect of the present disclosure, the operations further include providing a user-detectable notification in response to determining that the current emotional state of the audio signal changes to the other emotional state of the plurality of emotional states.

According to another aspect of the present disclosure, the operations further include providing a user-actionable conduct with the user-detectable notification in response to determining that the current emotional state of the audio signal changes to the other emotional state of the plurality of emotional states. In this regard, the user-actionable conduct is determined based on the current emotional state from which the audio signal changes and the other emotional state to which the current emotional state changes FIG. 1 is an illustrative embodiment of a general computer system, on which a method to provide real-time tracking of emotions may be implemented, which is shown and is designated 100. In this regard, the computer system 100 may additionally or alternatively implement a method for detecting an emotional state change in an audio signal.

The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed)

network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
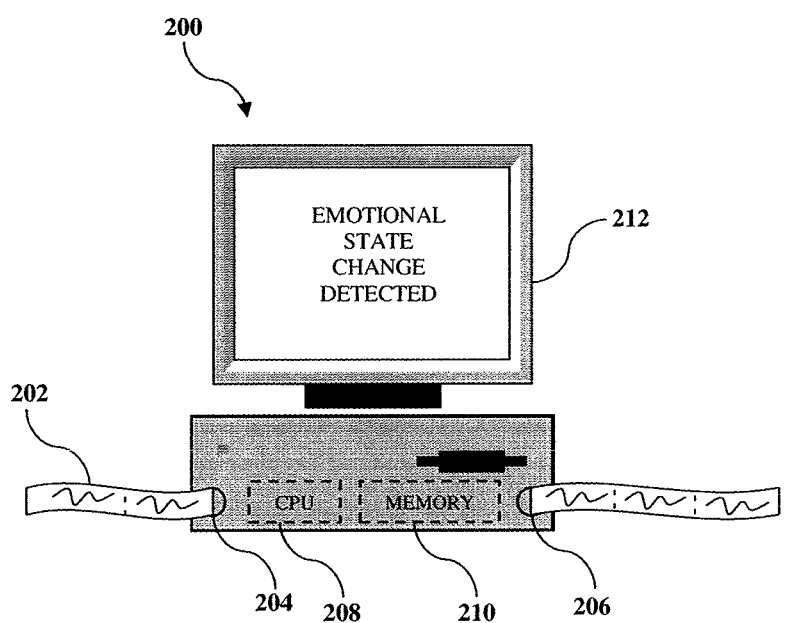
FIG. 2 is an exemplary device for real-time tracking of emotions and detecting an emotional state change in an audio signal, according to an aspect of the present disclosure.

An exemplary embodiment of a device 200 for real-time emotion tracking in a signal 202 and for detecting an emotional state change in the signal 202 is generally shown in FIG. 2. The term "real-time" is used herein to describe various methods and means by which the device 200 tracks emotions in the signal 202. In this regard, the term "real-time" is intended to convey that the device 200 tracks and detects emotions in the signal 202 at a same rate at which the device 200 receives the signal 202. In embodiments of the present application, the device 200 may receive the signal 202 in actual time, or live. In other embodiments of the present application the device 200 may receive the signal 202 on a delay, such as, for example, a recording of the signal 202. The recording may comprise the entire signal 202, or may comprise a filtered or edited version of the signal 202. In any event, the device 200 is capable of tracking and detecting the emotions at a same rate at which the device 200 receives the signal 202. Of course, those of ordinary skill in the art appreciate that the device 200 may also track the emotions at a different rate than at which the device 200 receives the signal 202, such as, for example, by performing additional operations than as described herein or by operating at a slower speed than required for real-time emotion tracking.

The device 200 may be, or be similar to, the computer system 100 as described with respect to FIG. 1. In this regard, the device 200 may comprise a laptop computer, a tablet PC, a personal digital assistant, a mobile device, a palmtop computer, a desktop computer, a communications device, a wireless telephone, a personal trusted device, a web appliance, a television with one or more processors embedded therein and/or coupled thereto, or any other device that is capable of executing a set of instructions, sequential or otherwise.

Embodiments of the device 200 may include similar components or features as those discussed with respect to the computer system 100 of FIG. 1. The device 200 may include each of the components or features, or any combination of the features or components shown in FIG. 1. Of course, those of ordinary skill in the art appreciate that the device 200 may also include additional or alternative components or features than those discussed with respect to the computer system 100 of FIG. 1 without departing from the scope of the present disclosure.

The signal 202 may be any signal which comprises audio content. In this regard, the signal 202 is not limited to comprising only audio content, but rather, may also comprise additional content, such as video content. Exemplary embodiments of the present disclosure are described herein wherein the signal 202 is generally referred to as an audio signal. However, those of ordinary skill in the art should appreciate that the present disclosure is not limited to being used with an audio signal and that the references to the audio signal are merely for illustrative purposes. The signal 202 may be a live signal which is propagated in real-time, or the signal 202 may be a recorded signal which is propagated on a delay. The signal 202 may be received by the device 200 via any medium that is commonly known in the art.

FIG. 2 shows the device 200 as including an input 204 for receiving the signal 202. In this regard, the input 204 may comprise a microphone for receiving the signal 202 "over-the-air" or wirelessly. However, in additional or alternative embodiments, the input 204 may comprise additional or alternative inputs which are commonly known and understood. For example, the input 204 may comprise a line-in jack, wherein the signal 202 is received via a wired connection.

The device 200 of FIG. 2 is further shown as including an output 206. In this regard, the output 206 may broadcast or transmit the signal 202, or the output 206 may be configured to broadcast or transmit results of the device 200, which are described in more detail herein.

The device 200 includes a processor 208 and a memory 210. The processor 208 may comprise any processor that is known and understood in the art, such as the processor 110 as described with respect to FIG. 1. In this regard, the processor 208 may comprise a central processing unit, a graphics processing unit, or any combination thereof. Although used in singular, the processor 208 is not limited to being a single processor, but instead, may comprise multiple processors. The memory 210 may also comprise any memory that is known and understood in the art, such as the main memory 120 or static memory 130 as described with respect to FIG. 1. The processor 208 and the memory 210 are shown in FIG. 2 as being housed or included within the device 200. Those of ordinary skill in the art appreciate, however, that either or both of the processor 208 and the memory 210 may exist independently of the device 200, such as, for example, in a distributed system.

The memory 210 stores instructions that are executable by the processor 208. The processor 208 executes the instructions for emotion tracking in the signal 202 and/or for detecting an emotional state change in the signal 202. The processor 208, itself, may execute the instructions and perform the corresponding operations as described herein. Alternatively, the processor 208 may execute the instructions and instruct additional devices or elements to perform the operations.

Figures 3, 4:
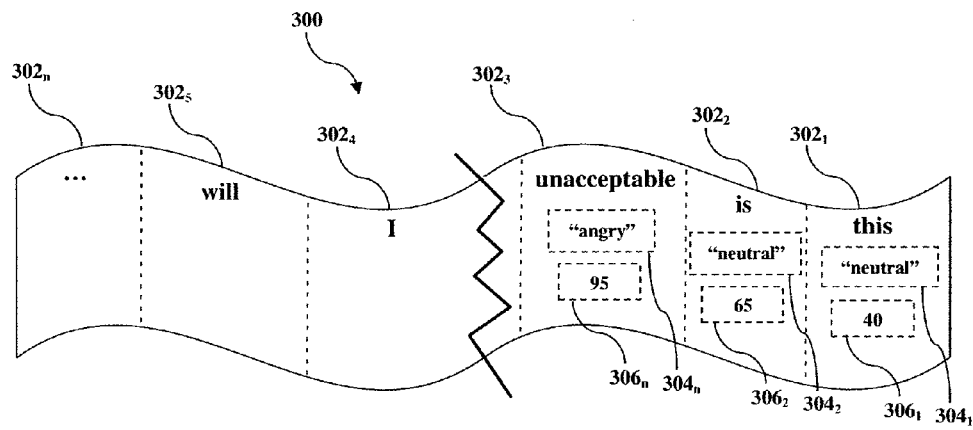
FIG. 3 is an exemplary schematic of a segmented audio signal, according to an aspect of the present disclosure.
FIG. 4 is an exemplary emotional state table, according to an aspect of the present disclosure.

When executed, the instructions cause the processor 208 to receive the signal 202. FIG. 3 shows an exemplary embodiment of the present disclosure in which the signal 202 is an audio signal 300, generally shown. The audio signal 300 includes a plurality of segments $302_{1, 2, \ldots, n}$. The segments $302_{1, 2, \ldots, n}$ are sequential in the audio signal 300. In other words, the segments $302_{1, 2, \ldots, n}$ are arranged in order in the audio signal 300. That is, the segments $302_{1, 2, \ldots, n}$ follow one another. In this regard, the segments $302_{1, 2, \ldots, n}$ may be consecutive in the audio signal 300 or comprise a series. Alternatively, the segments $302_{1, 2, \ldots, n}$ may comprise a random, predetermined, or otherwise determined sampling of segments of the audio signal 300, as described in more detail below, which are nonetheless arranged in order in the audio signal 300.

The segments $302_{1, 2, \ldots, n}$ are shown in FIG. 3 as each comprising a word of speech of the audio signal 300. In this regard, each word of speech of the audio signal 300 may comprise one of the segments $302_{1, 2, \ldots, n}$, or only words of speech which satisfy a predetermined criteria may comprise one of the segments $302_{1, 2, \ldots, n}$. For example, the segments $302_{1, 2, \ldots, n}$ may include words of speech which are greater than a predetermined length, or which have a general usage frequency which is below a predetermined threshold. Of course, those of ordinary skill in the art appreciate that additional methods and means for determining which words of speech of the audio signal 300 comprise a the segments $302_{1, 2, \ldots, n}$ may be employed without departing from the scope of the present disclosure. For example, the words of speech of the audio signal 200 which comprise the segments $302_{1, 2, \ldots, n}$ may be only those words of speech which satisfy a paralinguistic property, such as those words of speech which are greater than or exceed a predetermined or average pitch, loudness, rate, frequency, etc. of the audio signal 300. They may also be those words of speech which follow predetermined words of speech or conditions, such as those words of speech which follow a pause of a predetermined length or a word of speech which is less than a predetermined length. Of course, those of ordinary skill in the art appreciate that the above-mentioned examples are merely exemplary and are not limiting or exhaustive.

Those of ordinary skill in the art also appreciate that the segments $302_{1, 2, \ldots, n}$ are not limited to comprising words of speech. For example, in additional embodiments of the present disclosure, the segments $302_{1, 2, \ldots, n}$ may comprise phrases of speech, such as sentences or word groupings. The phrases of speech may be determined in accordance with any of the above-mentioned criteria and/or conditions. The phrases of speech may be analyzed, as discussed in more detail below, in their entirety, or the phrases of speech may be filtered or selectively analyzed. For example, the phrases of speech may be filtered in accordance with any of the above-discussed parameters or conditions, or may be additionally or alternatively filtered in accordance with any further parameters or conditions which are known in the art.

According to an embodiment of the present disclosure, the device 200 receives the plurality of segments $302_{1, 2, \ldots, n}$ of the audio signal 300. The input 204 of the device 200 may receive the plurality of segments $302_{1, 2, \ldots, n}$ of the audio signal 300. According to such an embodiment, the audio signal 300 is segmented externally of the device 200, such as, by an automatic speech recognition unit. In further embodiments of the present disclosure, the device 200 may segment the audio signal 300. The processor 208 of the device 200 may segment the audio signal 300 in accordance with any of the manners or methods discussed herein, or the device 200 may additionally or alternatively include an automatic speech recognition unit for segmenting the audio signal 300 in accordance with the manners and methods discussed herein.

The device 200 sequentially analyzes each segment 302 of the plurality of segments $302_{1, 2, \ldots, n}$ and determines, for each segment 302, an emotional state 304 from among a plurality of emotional states $304_{1, 2, \ldots, n}$ and a confidence score 306 of the emotional state 304. For example, in an embodiment of the present disclosure including a phone-based transaction between a customer and a company representative, the device 200 may track an emotional state of the customer and/or the company representative throughout the transaction. The device 200 may track the emotional state of the customer and/or the company representative in real-time, or the device 200 may track the emotional state of the customer and/or the company representative on a delay or in a recording of the phone-based transaction. In other words, the device 200 may provide real-time or delayed tracking of a user's emotional state during his or her interactions with his or her peers, regardless of whether the user is the customer or the company representative or agent. Said another way, the device 200 may track the emotional state 304 of either the customer or the company representative, track the emotional state of each of the customer and the company representative, or track an overall combined emotional state of both of the customer and the company representative.

The processor 208 of the device 200 analyzes each segment 302 of the phone-based transaction and is able to is able to assign an emotional state 304, or and emotion tag, with a certain confidence score 306 for every segment 302 or word spoken by the customer and/or the company representative. To do so, the device 200 may be construed as including two layers working in a cascade: the first layer takes the audio signal 300 as an input, and outputs a probability that each segment 302 of the audio signal 300 that is under consideration, such as a word of speech, belongs to a certain emotional state or class from among a plurality of different emotional states $304_{1, 2, \ldots, n}$ or classes. The emotional states $304_{1, 2, \ldots, n}$ or classes, hereinafter referred to as the emotional states $304_{1, 2, \ldots, n}$ may include, but are not limited to, "neutral", "indifferent", "satisfied", "angry", "frustrated", etc. Of course, those of ordinary skill in the art appreciate that the above-listed examples of the emotional states $304_{1, 2, \ldots, n}$ are merely exemplary and are not limiting or exhaustive.

As shown in FIG. 3, for example, the device 200 may assign an emotional state 304 of "neutral" to segment $302_1$ and segment $302_2$, which comprise the words of "this" and "is", respectively. The device 200 may assign the emotional state 304 of "neutral" to each segment 302 independently without regard to any of the other segments $302_{1, 2, \ldots, n}$. Alternatively, the device 200 may assign the emotional state 304 of "neutral" to each segment 302 by upon consideration of the other segments $302_{1, 2, \ldots, n}$. In this regard, the device 200 may consider a history of the emotional states $304_{1, 2, \ldots, n}$ of past ones of the segments $302_{1, 2, \ldots, n}$. The device 200 may also or alternatively look-ahead so as to consider possible emotional states $304_{1, 2, \ldots, n}$ of future ones of the segments $302_{1, 2, \ldots, n}$.

In analyzing each segment 302 and assigning the emotional state 304, the device 200 further assigns a confidence score 306 of the emotional state 304. The confidence score 306 may reflect a degree or level of confidence in the analysis which determines the emotional state 304. Said another way, the confidence score 306 may reflect a strength or belief in the accuracy of the emotional state 304.

According to an embodiment of the present disclosure, the device 200 may determine the emotional state 304 and the confidence score 306 of each segment 302 by analyzing the segment 302 in accordance with a plurality of analyses. For example, according to an embodiment of the device 200, each segment 302 may be analyzed in accordance with its linguistic or lexical properties, and also analyzed in accordance with its paralinguistic properties. That is, each segment 302 may be analyzed based on its plain and ordinary meaning in accordance with its definition, connotation, and/or denotation. Each segment 302 may additionally or alternatively be analyzed in accordance with its acoustic properties, pitch, and/or volume. Of course, the above-listed properties are merely exemplary and the segments $302_{1, 2, \ldots, n}$ may additionally or alternatively be analyzed in accordance with additional or alternative linguistic and paralinguistic properties.

In the above-discussed embodiment of the present disclosure in which the device 200 determines the emotional state 304 and the confidence score 306 of each segment 302 by analyzing the segment 302 in accordance with a plurality of analyses, the device 200 may determine, for each segment 302, a plurality of emotional states $304_{1, 2, \ldots, n}$ and a plurality of confidence scores $306_{1, 2, \ldots, n}$ of the plurality of emotional states $304_{1, 2, \ldots, n}$. Each of the plurality of emotional states $304_{1, 2, \ldots, n}$ and the plurality of confidence scores $306_{1, 2, \ldots, n}$ may be determined in accordance with one of the plurality of analyses. For example, an emotional state 304 and confidence score 306 may be determined in accordance with a linguistic or lexical analysis, and another emotional state 304 and another confidence score 306 may be determined in accordance with a paralinguistic analysis.

According to the above-described embodiment, the emotional states $304_{1, 2, \ldots, n}$ and the confidence scores $306_{1, 2, \ldots, n}$ that are determined in accordance with the analyses for each segment 302 may be combined into a single emotional state 304 and a single confidence score 306 for each segment 302. In this regard, the emotional states $304_{1, 2, \ldots, n}$ and the confidence scores $306_{1, 2, \ldots, n}$ may be averaged to determine a single emotional state 304 and a single confidence score 306. The emotional states $304_{1, 2, \ldots, n}$ may be averaged in accordance with a predetermined criteria. For example, an emotional state 304 of "angry" and an emotional state 304 of "happy" may be defined to produce an averaged emotional state 304 of "neutral". In additional or alternative embodiments of the device 200, the emotional states $304_{1, 2, \ldots, n}$ may be combined based on the confidence scores $306_{1, 2, \ldots, n}$. For example, the emotional states $304_{1, 2, \ldots, n}$ may be weighted and combined based on a strength of their respective confidence scores $306_{1, 2, \ldots, n}$. Additionally or alternatively, one of the emotional states $304_{1, 2, \ldots, n}$ having a greater confidence score 306, or a confidence score 306 which exceeds another score by at least a predetermined threshold value, may be determined to trump or take precedence over the other confidence score. The emotional states $304_{1, 2, \ldots, n}$ and/or confidence scores $306_{1, 2, \ldots, n}$ may further be combined in accordance with a predetermined priority. For example, an emotional state 304 of "angry" may be determined to have priority over another emotional state 304 of "neutral". Of course, the above-listed examples are merely exemplary and are not intended to be limiting or exhaustive. Those of ordinary skill in the art understand that the emotional states $304_{1, 2, \ldots, n}$ and the confidence scores $306_{1, 2, \ldots, n}$ of a segment 302 may be combined in additional or alternative manners which are known and understood in the art without departing from the scope of the present disclosure.

The processor 208 of the device 200 sequentially analyzes the emotional state 304 and the confidence score 306 of each segment 302, and tracks a current emotional state of the audio signal 300 throughout each of the plurality of segments $302_{1, 2, \ldots, n}$. An exemplary embodiment of an emotional state table 400 is shown in FIG. 4 of the present disclosure in which the current emotional state 402 of an audio signal 300 is tracked through each segment. The device 200 may store the emotional state table 400 in the memory 210 of the device. The second layer of the device 200, as mentioned above, may be responsible for tracking the time-evolution of the emotional state 304 and the confidence score 306 of each of the segments $302_{1, 2, \ldots, n}$ of the audio signal 300. The second layer may also be for defining an overall emotional state of the user that is determined in accordance with the current emotional state 402 that is tracked throughout each segment 302 of the audio signal 300. The overall emotional state may be determined in accordance with any of the above methods discussed with respect to the feature of combining a plurality emotional states $304_{1, 2, \ldots, n}$ or determined in accordance with any other known method. The current emotional state 402 may be defined in in real-time as the audio signal 300 may be processed in real-time.

By tracking the temporal evolution of the emotional states $304_{1, 2, \ldots, n}$ and the confidence scores $306_{1, 2, \ldots, n}$ of the segments $302_{1, 2, \ldots, n}$, the device 200 is able to demark when there is a transition from one emotional state 304 to another emotional state 304, such as going from an emotional state 304 of "neutral" to an emotional state 304 of "frustrated" or from an emotional state 304 of "angry" to an emotional state 304 of "satisfied". In other words, the device 200 is able to determine, for each segment 302, whether the current emotional state 402 of the audio signal 300 changes to another emotional state 304 of the plurality of emotional states $304_{1, 2, \ldots, n}$ based on the emotional state 304 and the confidence score 306 of the segment 302.

According to an embodiment of the disclosure, the device 200 may determine whether the current emotional state 402 of the audio signal 300 changes to another emotional state 304 based on the emotional state 304 and the confidence score 306 of one of the segments $302_{1, 2, \ldots, n}$ alone. For example, with respect to the exemplary embodiment shown in FIG. 4, the device 200 may determine that the current emotional state 402 changes from "satisfied" to "angry" at 404 merely based on the confidence score 306 of segment 3023 alone. The word "unacceptable" is a strong indicator of an emotional state 304 of "angry", and thus, the device 200 may change the current emotional state 402 based on the analysis of segment 3023 alone. According to such an embodiment, the processor 208 of the device 200 may determine that the current emotional state 402 of the audio signal 300 changes to another emotional state 304 when the confidence score 306 of one of the segments $302_{1, 2, \ldots, n}$ is greater than a predetermined threshold. In this regard, the current emotional state 402 may be changed to the emotional state 304 of the corresponding one of the segments $302_{1, 2, \ldots, n}$ for which the confidence score 306 is greater than a predetermined threshold In additional or alternative embodiments of the device 200, the processor 208 may change the current emotional state 402 based on an analysis of multiple ones of the segments $302_{1, 2, \ldots, n}$. For example, with respect to the example discussed above, the processor 208 may considered the emotional state 304 and/or the confidence score 306 of segment $302_1$ and segment $302_2$ when determining whether the current emotional state 402 should be changed. The processor 208 may determine that the emotional state 304 of segment $302_1$ and the emotional state 304 of segment $302_2$ does not correspond to the current emotional state 402 and/or consider that the confidence score 306 of segment $302_1$ and the confidence score 306 segment $302_2$ are weak in determining whether the current emotional state 402 should be changed.

In an additional embodiment, if several consecutive ones of the segments $302_{1, 2, \ldots, n}$ or a predetermined number of the segments $302_{1, 2, \ldots, n}$ within a predetermined time frame have an emotional state 304 of "angry" but the confidence score 306 of each of those segments $302_{1, 2, \ldots, n}$ is below the predetermined threshold, the processor 208 may nonetheless change the current emotional state 402 to the emotional state 304 of the segments $302_{1, 2, \ldots, n}$ based on the analysis of those segments $302_{1, 2, \ldots, n}$ in total.

In an additional example of an embodiment of the device 200 in which the processor 208 may change the current emotional state 402 based on the analysis of multiple ones of the segments $302_{1, 2, \ldots, n}$, the processor 208 may consider whether a number of consecutive ones of the segments $302_{1, 2, \ldots, n}$, or near consecutive ones of the segments $302_{1, 2, \ldots, n}$, differ from the current emotional state 402 and/or are uncertain or weak. That is, the processor 208 may determine that the current emotional state 402 of the audio signal 300 changes to another emotional state 304 when the emotional state 304 of a segment 302 is different from the current emotional state 402 for each of a predetermined number of consecutive, or near consecutive, ones of the segments $302_{1, 2, \ldots, n}$. Additionally or alternatively, the processor 208 may determine that the current emotional state 402 of the audio signal 300 changes to another emotional state 304 when the confidence score 306 of the emotional state 304 for each of a predetermined number of consecutive, or near consecutive, ones of the segments $302_{1, 2, \ldots, n}$ is below a predetermined threshold. For example, if the confidence score 306 of a predetermined number of consecutive ones of the segments $302_{1, 2, \ldots, n}$ is, for example, less than "20", the processor 208 may determine that any previous emotional state 304 which may have existed has dissipated and may change the current emotional state 402 to "neutral", or any other predetermined state. Of course those of ordinary skill understand that the processor 208 may change the current emotional state 402 of the audio signal 300 in accordance with any of the above-discussed methods alone or in combination. Moreover, the processor 208 may additionally or alternatively change the current emotional state 402 of the audio signal 300 in accordance with additional or alternative methods.

Nevertheless, tracking the current emotional state 402 of the audio signal 300 and determining whether the current emotional state 402 changes to another emotional state 304 as discussed above enables a user or party, such as a company representative or agent, to monitor the current emotional state 402 of another user or party, such as a customer, in real-time. In this regard, the processor 208 of the device 200 may provide a user-detectable notification in response to determining that the current emotional state 402 of the audio signal 300 changes to another emotional state 304. The device 200 may, for example, provide a user-detectable notification on a display 212 of the device 200, as shown in FIG. 2.

In embodiments of the present disclosure, the device 200 may provide a notification of any and all emotional state changes 404. In alternative embodiments, the device 200 may provide the user-detectable notification only in response to determining that the current emotional state 402 of the audio signal 300 changes from a first predetermined emotional state 304 to a second predetermined emotional state 304. For example, the device 200 may provide the user-detectable notification only in response to determining that the current emotional state 402 of the audio signal 300 changes from "satisfied" to "angry". In this regard, the device 200 may display different user-detectable notifications in response to different predetermined state changes. In even further embodiments, the device 200 may provide the user-detectable notification whenever the current emotional state 402 changes to a predetermined emotional state 304, such as, for example, "angry", and/or whenever the current emotional state 402 changes from a predetermined emotional state 304, such as, for example, "satisfied".

According to such a user-detectable notification, if the tracked user or party is the customer, the other user or party, such as the company representative or agent, may be notified and can adjust his or her responses or actions accordingly. If the tracked user is the company representative or agent, a performance or demeanor of the company representative or agent may be monitored and logged. Such real-time feedback may provide data towards assessing customer satisfaction and customer care quality. For example, the detection of the emotional state change 404 from a negative one of the emotional states $304_{1, 2, \ldots, n}$ to a positive one of the emotional states $304_{1, 2, \ldots, n}$, or even to one of the emotional states $304_{1, 2, \ldots, n}$ including a decrease in negative emotion, is a sign that the company representative or agent has succeeded in his or her role, whereas an emotional state change 404 in a reverse direction indicates that customer care quality should be improved.

Along these lines, the processor 208 of the device 200 may provide a user-actionable conduct with the user-detectable notification in response to determining that the current emotional state 402 of the audio signal 300 changes to another one of the emotional states $304_{1, 2, \ldots, n}$. That is, the processor 208 may provide a suggested course of conduct along with the notification of the emotional state change 404. The user-actionable conduct may be determined based on the current emotional state 402 from which the audio signal 300 changes and/or the one of the emotional states $304_{1, 2, \ldots, n}$ to which the current emotional state 402 changes.

The above-discussed layer one and layer two are generally related to emotion tracking and detection of emotion state changes. In further embodiments of the device 200, a third layer may be added to the device 200 which consists of instructions or models that predict the possible user-actionable conduct or follow-up action. Such a layer may track the sentiment with which a user, such as a customer, client, representative, agent, etc., places on possible follow-up actions in order to track sentiment of the device 200.

According to an exemplary scenario of the device 200, a customer may buy a new smartphone from a store where a sales representative promised him that he would not have to pay any activation fees and that he would get a mail-in rebate within two weeks from the purchase date. At the end of the month, the customer may receive a new bill notice in which an activation fee is included. Besides that, the customer may not yet have received the mail-in rebate. These two facts together may upset the customer, and he may call customer service to try to sort things out. The device 200 may immediately recognize and notify a call center representative that the customer is "angry", and also provide a user-actionable conduct. Based on the user-detectable notification, the call center representative might employ a particular script, or other solution that may be in accordance with the user-actionable conduct, for interacting with the "angry" customer. The call center representative may try to calm the customer down and to explain the process of how to receive a rebate for the activation fee. Upon hearing the explanation, the customer may calm down if his problem is solved to his satisfaction. In parallel to the customer-and-agent interaction, the device 200 may be tracking the progress of any the emotional states $304_{1, 2, \ldots, n}$ of the customer and may identify the emotional state change 404 from the "angry" state to a "satisfied" state. Once the conversation stabilizes at the "satisfied" state, the device 200 may flag the issue as being "resolved".

In the above scenario, the device 200 performed three tasks. First, it notified the call center representative of the customer's initial emotional state 304, which allowed the call center representative to use an appropriate solution. Second, it tracked the customer's emotional state 304 and identified the emotional state change 404 from one of the emotional states $304_{1, 2, \ldots, n}$ to another of the emotional states $304_{1, 2, \ldots, n}$. Third, based on the emotional state change 404, it predicted whether the customer dispute was resolved or not. In addition to the above, the device 200 may also log the call center representative's success as part of an employee performance tracking program.

According to another exemplary scenario of the device 200, a call center may hire several new customer service agents. The call center may want to assess the performance of each of the new customer service agents to find out the different strengths and weaknesses of the new customer service agents, which of the new customer service agents needs further training, and what kind of training the new customer service agents need. So, at the end of each day, for each new customer service agent, a supervisor may queries the device 200 for different kinds of aggregate measures that indicate the new customer service agents' ability to handle unhappy customers, e.g., the number of customer-agent interactions that were flagged as resolved by the device 200, whether there were any calls in which the customer emotion transitioned from a "calm" state to an "angry" state in the middle of the conversation, etc. The supervisor may also look in detail at an emotional state table 400, as shown in FIG. 4, or a small sample of emotion transition graphs that are generated for each new customer service agent. Using this method, the supervisor may assess the performance of each new customer service agent and provide feedback. In this scenario, the device 200 may aid the assessment of customer care quality in terms of agent performance.

According to a further exemplary scenario of the device 200, a call center may get several new solutions for handling customers who may be at the risk of canceling or dropping service. The call center may want to try the new solutions and compare them to existing solutions. As such, a call center supervisor may instruct agents to use both the existing solutions as well as the new solutions for handling customers who are at risk of canceling or dropping their service. At the end of the day, for each solution, or script, the supervisor may query the device 200 for different kinds of aggregate measures that indicate which solutions or scripts were most successful at resolving the problems of these at-risk customers. The supervisor may also look in detail at a small sample of emotional state tables 400 or emotion transition graphs related to each solution to find out if there were any salient features of successful versus unsuccessful solutions. In this scenario, the device 200 may help improve customer care quality by aiding the assessment of different policies for handling customer problems.

The above-described examples and scenarios describe situations in which the device 200 may be used in a call center environment to track and monitor emotional state changes 404 of a customer and/or company representative or agent. The device 200, however, may be further used in additional or alternative environments and include different or alternative functions.

For example, in an additional embodiment of the present disclosure, the processor 208 of the device 200 may issue an instruction for controlling a motorized vehicle in response to determining that the current emotional state 402 of the audio signal 300 changes to another one of the emotional states $304_{1, 2, \ldots, n}$. In this regard, the device 200 may be a safety mechanism in the motorized vehicle, such as an automobile. A driver may be asked to speak to the device 200, and the device 200 may decide whether the driver is in an emotional condition that could threaten his or her and other drivers' lives.

In a further embodiment of the present disclosure, the processor 208 of the device 200 may issue an instruction for controlling an alarm system in response to determining that the current emotional state 402 of the audio signal 300 changes to another one of the emotional states $304_{1, 2, \ldots, n}$. In this regard, the device 200 may be installed along with the alarm system in a home. If and when there is a distress signal coming from the home, the device 200 may track any emotional states $304_{1, 2, \ldots, n}$ of the homeowner. As such, the system may provide valuable clues to distinguish between true and false alarms. For example, if an emotional state of the homeowner transitions from an emotional state 304 of "excited" to an emotional state 304 of "calm", the device 200 may presume that the alarm is a false alarm.

Figure 5:
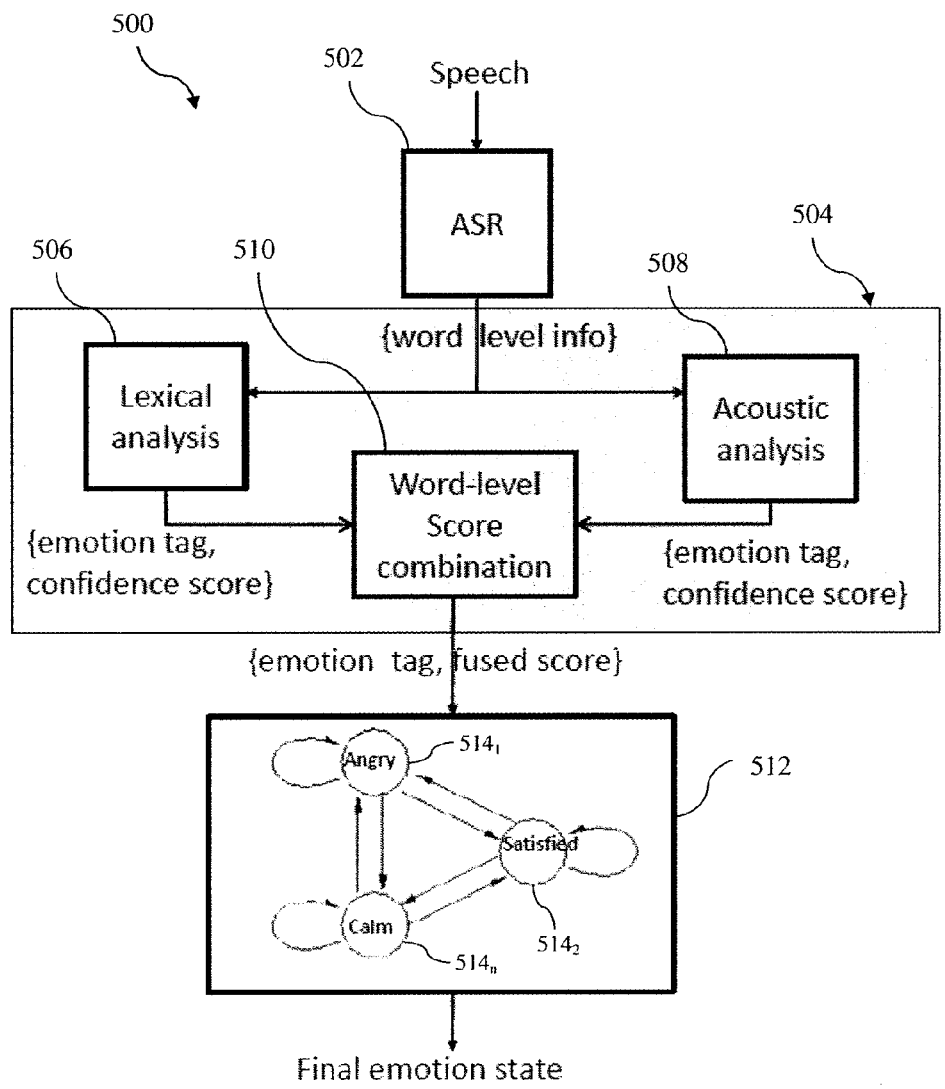
FIG. 5 is an exemplary schematic of a system for real-time tracking of emotions and detecting an emotional state change in an audio signal, according to an aspect of the present disclosure.

An exemplary system 500 for real-time emotion tracking in a signal and for detecting an emotional state change in a signal is generally shown in FIG. 5. The system 500 recognizes a speaker's emotional state based on different acoustic and lexical cues. For every word uttered, the first layer of the system 500 provides a tag that corresponds to one of the emotional states $304_{1, 2, \ldots, n}$ along with one of the emotional or confidence scores $306_{1, 2, \ldots, n}$. The emotional states $304_{1, 2, \ldots, n}$ and the confidence scores $306_{1, 2, \ldots, n}$ are set as an input to a second layer that combines all the emotional states $304_{1, 2, \ldots, n}$ and the confidence scores $306_{1, 2, \ldots, n}$ and keeps track of their time evolution. The second layer of the system 500 is responsible for the real-time emotion recognition and tracking feedback that the system 500 provides.

In more detail, the system 500 provides speech input to a speech recognition module 502 that returns recognized text. The speech recognition module 502 may comprise an automatic speech recognition (ASR) unit. A feature extraction unit 504 extracts the associated lexical features and acoustic features of the speech and produces two information streams, e.g., a textual stream and an acoustic stream, in parallel as inputs for two separate classifiers, which form the first layer of the system 500. A lexical analysis unit 506 and an acoustic analysis unit 508 are shown in FIG. 5 as the classifiers. Nevertheless, additional or alternative classifiers may also be used in accordance with the features as discussed above with respect to the device 200.

The lexical analysis unit 506 and the acoustic analysis unit 508 provide the emotional tags, or emotional states $304_{1, 2, \ldots, n}$, and the confidence scores $306_{1, 2, \ldots, n}$ that are fed into a word-level score combination unit 510. The word-level score combination unit 510 combines the emotional tags, or the emotional states $304_{1, 2, \ldots, n}$, and the confidence scores $306_{1, 2, \ldots, n}$ from the lexical analysis unit 506 and the acoustic analysis unit 508 into a single emotional tag and a fused score, and outputs the emotional tag and the fused score to an emotion state detection unit 512.

The emotion state detection unit 512 keeps track of current emotional states $514_{1, 2, \ldots, n}$ of a speaker over time. The emotion state detection unit 512 is a second layer of the system 500. A temporal component of the emotion state detection unit 512 has a "short memory" of the emotional tags of the previous words and decides on the emotional tag of a current word based on what it knows about the emotional tags and/or the fused scores of the previous words. The emotion state detection unit 512 tracks the current emotional states $514_{1, 2, \ldots, n}$ of the speech.

The two-layer architecture of the feature extraction unit 504 and the emotion state detection unit 512 provides the real-time capabilities of the system 500. Based on these capabilities, it is possible to detect the emotional state changes 404 or transitions from one of the emotion tags or emotional states $304_{1, 2, \ldots, n}$ to another of the emotion tags or emotional states $304_{1, 2, \ldots, n}$.

Figure 6:
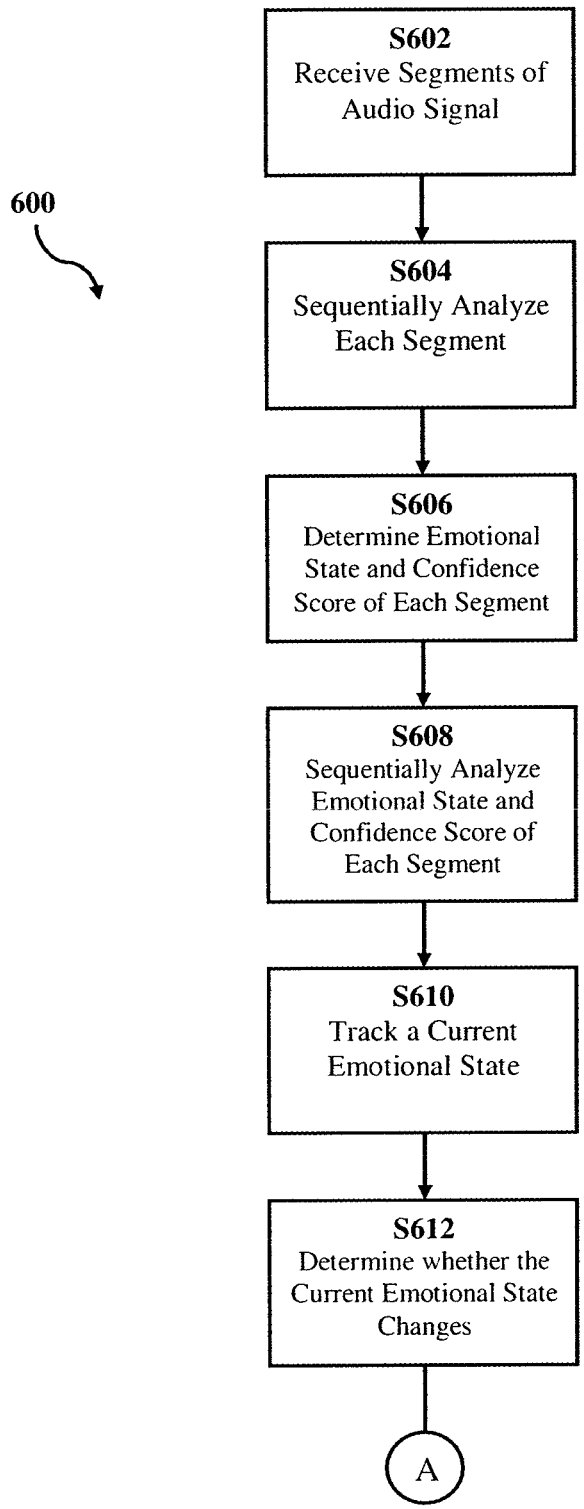
FIG. 6 is an exemplary method for real-time tracking of emotions and detecting an emotional state change in an audio signal, according to an aspect of the present disclosure.
Figure 7:
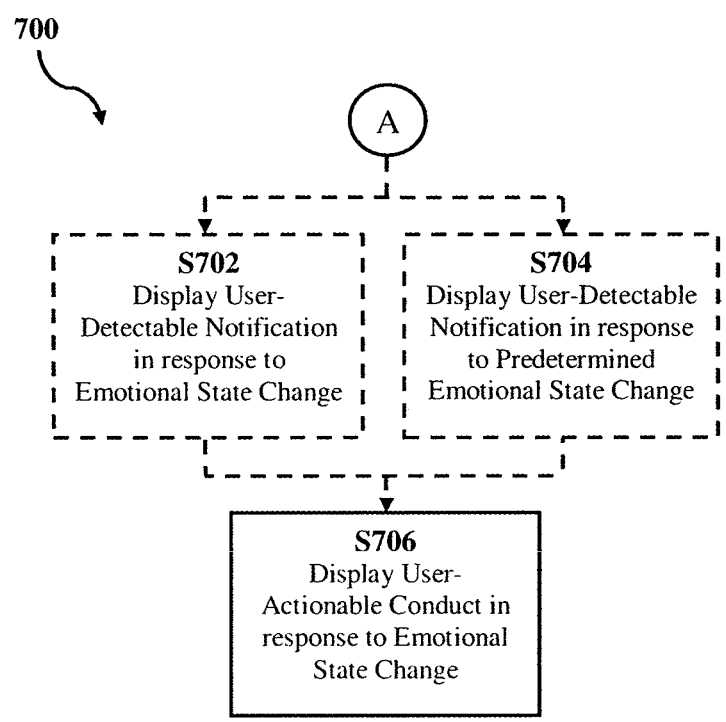
FIG. 7 is an exemplary embodiment of the method of FIG. 6 for real-time tracking of emotions and detecting an emotional state change in an audio signal, according to an aspect of the present disclosure.
Figure 8:
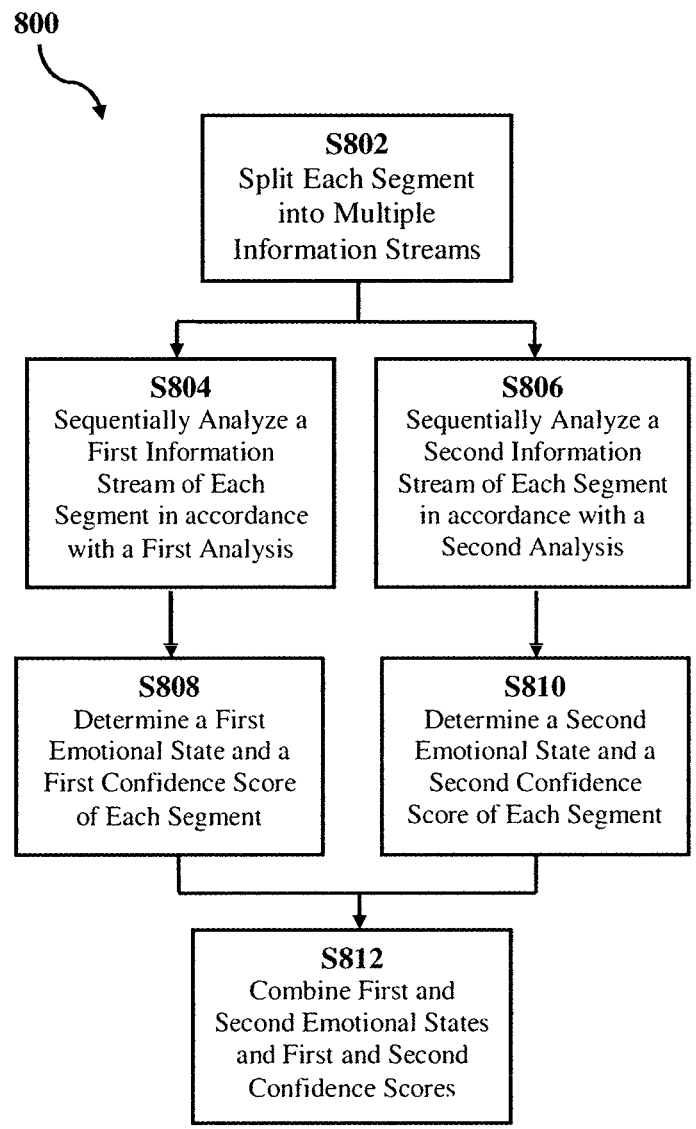
FIG. 8 is a further exemplary embodiment of the method of FIG. 6 for real-time tracking of emotions and detecting an emotional state change in an audio signal, according to an aspect of the present disclosure.

According to further embodiments of the present disclosure, as shown by FIGS. 6-8, various methods may provide for real-time emotion tracking in a signal and for detecting an emotional state change in the signal. The methods may be computer-implemented or implemented in accordance with any other known hardware or software which is capable of executing a set of instructions, steps, or features, sequentially or otherwise.

FIG. 6 shows an exemplary method 600 for detecting an emotional state change in an audio signal. According to the method 600, a plurality of segments of the audio signal is received at S602. The plurality of segments is sequential and may comprise, for example, words or phrases of speech in the audio signal. The method sequentially analyzes each segment of the plurality of segments at S604. Each segment may be sequentially analyzed with a processor. For each segment, an emotional state from among a plurality of emotional states and a confidence score of the emotional state is determined at S606. The emotional state and the confidence score of each segment are sequentially analyzed at S608, and a current emotional state of the audio signal is tracked throughout each of the segments at S610. For each segment, it is determined whether the current emotional state of the audio signal changes to another emotional state based on the emotional state and the confidence score of the segment at S612. In this regard, as discussed above, a processor may determine whether the current emotional state changes to another emotional state based on each segment individually or based on the segments collectively.

Further embodiments of the method 600 of FIG. 6 are shown in FIG. 7. In this regard, the method 700 of FIG. 7 may be an extension of the method 600 shown in FIG. 6. According to an embodiment of the method 700, a user-detectable notification is provided in response to determining that the current emotional state of the audio signal changes to another emotional state at S702. The user-detectable notification may be provided by being displayed, for example, on the display 212 of the device 200 as described with respect to FIG. 2. In this regard, the user-detectable notification may be displayed in response to detecting any change in the current emotional state of the audio signal.

In an alternative embodiment of the method 700 shown in FIG. 7, the user-detectable notification is provided only in response to determining that the current emotional state of the audio signal changes from a first predetermined state of the plurality of emotional states to a second predetermined state of the plurality of emotional states at S704. For example, the user-detectable notification may be provided only in response to determining that the current emotional state of the audio signal changes from "satisfied" to "angry". In even further embodiments of the method 700, the user-detectable notification may be provided whenever the current emotional state changes to a predetermined emotional state, and/or whenever the current emotional state changes from a predetermined emotional state. The method 700 may additionally or alternatively provide different user-detectable notifications in response to different predetermined state changes.

The embodiment of the method 700 shown in FIG. 7 further provides a user-actionable conduct with the user-detectable notification in response to determining that the current emotional state of the audio signal changes to another emotional state at S706. The user-actionable conduct may be provided by being displayed, for example, on the display 212 of the device 200 as described with respect to FIG. 2. In this regard, the user-actionable conduct may be determined based on the current emotional state from which the audio signal changes and the emotional state to which the audio signal changes.

A further embodiment of the method 600 of FIG. 6 is shown in FIG. 8. In this regard, the method 600 of FIG. 6 may be modified by replacing S604 and S606 of the method 600 with the method 800 as shown in FIG. 8. According to the method 800, each segment of the audio signal may be split into multiple information streams at S802. For example, each segment may be split into a linguistic or lexical information stream and a paralinguistic information stream. A first information stream of each segment of the audio signal is sequentially analyzed in accordance with a first analysis at S804, and a second information stream of each segment of the audio signal is sequentially analyzed in accordance with a second analysis at S806. The first and second information streams may be analyzed, for example, by a lexical analysis and an acoustic analysis. Of course those of ordinary skill in the art appreciate that the first and second streams may be analyzed by additional or alternative analyses without departing from the scope of the present disclosure.

A first emotional state and a first confidence score of the first emotional state may be determined for the first information stream of each segment of the audio signal at S808, and a second emotional state and a second confidence score of the second emotional state may be determined for the second information stream of each segment of the audio signal at S810. Thereafter, the first and second emotional states and the first and second confidence scores of each segment may be combined to produce a single emotional state and a single confidence score for each segment of the audio signal at S812.

While the present disclosure has generally been described above with respect to the device 200 for real-time emotion tracking in a signal and for detecting an emotional state change in the signal as shown in FIG. 2, those skilled in the art, of course, appreciate that the various features and embodiments of the above-described device 200 may be incorporated into the above-described methods 600, 700, 800 without departing from the scope of the present disclosure. Moreover, those skilled in the art appreciate that the various features and embodiments of the above-described device 200 and methods 600, 700, 800 may be further implemented as a tangible or non-transitory computer-readable medium, program, or code segment which is executable for causing a device, server, computer, or system to operate in accordance with the above-described device 200 and/or methods 600, 700, 800.

Accordingly, the present disclosure enables real-time tracking of emotions and further enables detecting of an emotional state change in real-time. Existing systems do not perform emotion tracking in real-time, but rather, require a significant amount of audio, e.g., a whole phone call, to analyze and classify for emotions. Due to this limitation, the existing systems are unable to track conversations between, for example, a caller and company representatives and to provide real-time feedback about the emotional state of the callers or the company representatives. The present disclosure, on the other hand, improves on the suboptimal state of the interactions between the callers and the company representatives by providing real-time feedback. For example, the present disclosure enables possible negative customer sentiments, such as low-satisfaction rates and net promoter scores (NPS), lack of brand loyalty, etc., to be addressed immediately.

Contrary to existing systems, the present disclosure may track caller and/or agent emotion in real time as a conversation is happening. As a result, the systems, devices, methods, media, and programs of the present disclosure can provide immediate feedback about caller emotion to the company representatives, so that the latter can bring to bear more appropriate solutions for dealing with potentially unhappy callers. The systems, devices, methods, media, and programs can also provide feedback to supervisors about customer care quality and customer satisfaction at the level of individual calls, customers, and agents, as well as aggregated measures.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while embodiments are often discussed herein with respect to telephone calls between callers, clients, or customers and agents or customer representatives, these embodiments are merely exemplary and the described systems, devices, methods, media, and programs may be applicable in any environment and would enable real-time emotion tracking or detection of emotional state changes in any audio signal.

Moreover, while the systems, devices, methods, media, and programs are generally described as being useable in real-time, those of ordinary skill in the art appreciate that the embodiments and features of the present disclosure need not be practiced and executed in real-time.

Even furthermore, the systems, devices, methods, media, and programs are generally described as enabling real-time tracking of emotions and detection of emotional state changes in audio signals, those of ordinary skill in the art appreciate that the embodiments and features of the present disclosure would also enable emotion tracking and detection of emotional state changes in video signals and other signals which include audio data.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, the processors described herein represent examples of the state of the art. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A device, comprising:
   a processor; and
   a memory storing instructions that, when executed by the processor, cause the processor to perform operations including:
   analyzing a plurality of segments of an audio signal based on a lexical evaluation and an acoustic evaluation;
   determining, for each segment of the plurality of segments, an emotional state from among a plurality of emotional states and a confidence score of the emotional state based on the analyzing of the plurality of segments;
   tracking a current emotional state of the audio signal for each of the plurality of segments; and
   determining, for a particular segment of the plurality of segments, whether the current emotional state of the audio signal changes to an other emotional state of the plurality of emotional states based on the emotional state of the particular segment and a comparison of the confidence score of the particular segment to a predetermined threshold.

2. The device according to claim 1, wherein the plurality of segments comprises a sampling of sequential segments of the audio signal.

3. The device according to claim 1, wherein the processor determines that the current emotional state of the audio signal changes to the other emotional state of the plurality of emotional states when the emotional state of a predetermined number of the plurality of segments is the other emotional state with the confidence score of the emotional state of each of the predetermined number of the plurality of segments being below a predetermined threshold.

4. The device according to claim 3, wherein the predetermined number of the plurality of segments are consecutive in the audio signal, and wherein the confidence score is based on a probability that the segment belongs to the emotional state.

5. The device according to claim 3, wherein the processor further determines that the current emotional state of the audio signal changes to the other emotional state of the plurality of emotional states when, for each of the predetermined number of the plurality of segments, the emotional state is not equal to the current emotional state with the confidence score of the emotional state being greater than the predetermined threshold.

6. The device according to claim 1, further comprising:
   a database that stores the audio signal and tracked emotional states in association with a customer service agent.

7. The device according to claim 6, wherein the processor is configured to identify transitions from a first emotional state to a second emotional state in the database.

8. The device according to claim 1, further comprising:
   an automatic speech recognition module that analyzes the audio signal to determine the plurality of segments, wherein each segment of the plurality of segments comprises one of a word or phrase, and wherein the lexical evaluation comprises determining a plain and ordinary meaning of the one of the word or phrase.

9. The device according to claim 8, wherein the analyzing of each segment is based in part on an emotional state of another segment of the plurality of segments.

10. The device according to claim 1, wherein each segment is analyzed in accordance with a plurality of analyses, for each segment, a plurality of emotional states and a plurality of confidence scores of the plurality of emotional states are determined in accordance with the plurality of analyses, and for each segment, the plurality of emotional states and the plurality of confidence scores of the plurality of emotional states are combined for determining the emotional state and the confidence score of the emotional state of the segment.

11. The device according to claim 1, the operations further including:
 issuing an instruction for controlling a motorized vehicle in response to determining that the current emotional state of the audio signal changes to the other emotional state of the plurality of emotional states.

12. The device according to claim 1, the operations further including:
 issuing an instruction for controlling an alarm system in response to determining that the current emotional state of the audio signal changes to the other emotional state of the plurality of emotional states.

13. A method, comprising:
 analyzing, by a system comprising a processor, a plurality of segments of an audio signal based on a linguistic evaluation and an paralinguistic evaluation;
 determining, for each segment of the plurality of segments and by the system, an emotional state from among a plurality of emotional states and a confidence score of the emotional state based on the analyzing of the plurality of segments;
 tracking, by the system, a current emotional state of the audio signal for each of the plurality of segments; and
 determining, for a particular segment of the plurality of segments and by the system, whether the current emotional state of the audio signal changes to an other emotional state of the plurality of emotional states based on the emotional state of the particular segment and a comparison of the confidence score of the particular segment to a predetermined threshold.

14. The method according to claim 13, further comprising determining, by the system, that the current emotional state of the audio signal changes to the other emotional state of the plurality of emotional states when the emotional state of the particular segment of the plurality of segments is the other emotional state with the confidence score of the emotional state of the one of the plurality of segments being greater than the predetermined threshold.

15. The method according to claim 14, wherein the processor determines that the current emotional state of the audio signal changes to the other emotional state of the plurality of emotional states when the emotional state of a predetermined number of the plurality of segments are the other emotional state with the confidence score of the emotional state of each of the predetermined number of the plurality of segments being below a predetermined threshold.

16. The method according to claim 15, further comprising determining, by the system, that the current emotional state of the audio signal changes to the other emotional state of the plurality of emotional states when, for the predetermined number of the plurality of segments, the emotional state is not equal to the current emotional state with the confidence score of the emotional state being greater than the predetermined threshold.

17. A machine-readable storage medium, comprising executable instructions that, when executed by a processor, facilitate performance of operations comprising:
 analyzing a plurality of segments of an audio signal based on a linguistic evaluation and an acoustic evaluation;
 determining, for each segment of the plurality of segments, an emotional state from among a plurality of emotional states and a confidence score of the emotional state based on the analyzing of the plurality of segments;
 tracking a current emotional state of the audio signal throughout each of the plurality of segments; and
 determining, for a particular segment of the plurality of segments, whether the current emotional state of the audio signal changes to an other emotional state of the plurality of emotional states based on the emotional state of the particular segment and a comparison of the confidence score of the particular segment to a predetermined threshold.

18. The machine-readable storage medium according to claim 17, wherein the determining whether the current emotional state of the audio signal changes to the other emotional state is based on a determination that the emotional state of a predetermined number of the plurality of segments is the other emotional state with the confidence score of the emotional state exceeding the predetermined threshold.

19. The machine-readable storage medium according to claim 18, wherein the predetermined number of the plurality of segments are consecutive in the audio signal.

20. The machine-readable storage medium according to claim 18, wherein the operations further comprise determining that the current emotional state of the audio signal changes to the other emotional state of the plurality of emotional states when, for the predetermined number of the plurality of segments, the emotional state is not equal to the current emotional state with the confidence score of the emotional state exceeding the predetermined threshold.

* * * * *